United States Patent
Omori (10) Patent No.: US 9,077,214 B2
(45) Date of Patent: Jul. 7, 2015

(54) MAGNETIC BEARING CONTROL DEVICE AND EXHAUST PUMP HAVING MAGNETIC BEARING CONTROL DEVICE

(75) Inventor: Hideki Omori, Chousei-gun (JP)

(73) Assignee: Edwards Japan Limited, Chiba (JP)

( * ) Notice: Subject to any disclaimer, the term of this patent is extended or adjusted under 35 U.S.C. 154(b) by 292 days.

(21) Appl. No.: 13/884,562

(22) PCT Filed: Jul. 21, 2011

(86) PCT No.: PCT/JP2011/066578
§ 371 (c)(1),
(2), (4) Date: May 9, 2013

(87) PCT Pub. No.: WO2012/070278
PCT Pub. Date: May 31, 2012

(65) Prior Publication Data
US 2013/0229079 A1  Sep. 5, 2013

(30) Foreign Application Priority Data
Nov. 24, 2010 (JP) .................. 2010-260959

(51) Int. Cl.
*H02K 7/09* (2006.01)
*F04D 19/04* (2006.01)
*F04D 29/058* (2006.01)
*F16C 32/04* (2006.01)

(52) U.S. Cl.
CPC ............... *H02K 7/09* (2013.01); *F04D 19/042* (2013.01); *F04D 29/058* (2013.01); *F16C 32/0446* (2013.01); *F16C 32/048* (2013.01); *F16C 2360/45* (2013.01); *F16C 32/0442* (2013.01)

(58) Field of Classification Search
CPC .............................. H02K 7/09; F04D 19/042
USPC .......................................... 310/90.5; 361/139
See application file for complete search history.

(56) References Cited

U.S. PATENT DOCUMENTS 7,355,833 B2 *  4/2008  Kozaki .......................... 361/139
7,525,784 B2 *  4/2009  Kozaki .......................... 361/139
(Continued)

FOREIGN PATENT DOCUMENTS

JP          2006-83924     *  3/2006  .............. F16C 32/04

*Primary Examiner* — Hanh Nguyen
(74) *Attorney, Agent, or Firm* — Shumaker & Sieffert, P.A.

(57) ABSTRACT

To provide a magnetic bearing control device that identifies a movable range of an eddy current gap sensor configuring a magnetic bearing and a center of the movable range and easily controls a rotor shaft and other controlled shafts, which are lifted by the magnetic bearing, in a central position of a protective bearing. The magnetic bearing control device has a first function for detecting an X-axis direction movable limit position of the rotor shaft; a second function for identifying a center of an X-axis movable range of an X-axis eddy current gap sensor (−X sensor, +X sensor) based on the X-axis direction movable limit position detected by the first function; a third function for detecting a Y-axis direction movable limit position of the rotor shaft; a fourth function for identifying a center of a Y-axis movable range of a Y-axis eddy current gap sensor (+Y sensor, −Y sensor) based on the Y-axis direction movable limit position detected by the third function; and a fifth function for turning an excitation current of a Y-axis electromagnet (+Y electromagnet, −Y electromagnet) OFF when the first function detects the X-axis direction movable limit position and the second function identifies the center of the X-axis movable range, and turning an excitation current of an X-axis electromagnet (+X electromagnet, −X electromagnet) OFF when the third function detects the Y-axis direction movable limit position and the fourth function identifies the center of the Y-axis movable rage.

2 Claims, 5 Drawing Sheets

(56) References Cited

U.S. PATENT DOCUMENTS

2002/0047402 A1* 4/2002 Taniguchi et al. ........... 310/90.5
2006/0017340 A1* 1/2006 Kozaki et al. ................ 310/90.5
2008/0088398 A1* 4/2008 Kozaki et al. ................ 335/295
2010/0133936 A1* 6/2010 Kuwata ........................ 310/90.5

* cited by examiner

MAGNETIC BEARING CONTROL DEVICE AND EXHAUST PUMP HAVING MAGNETIC BEARING CONTROL DEVICE

BACKGROUND OF THE INVENTION

1. Field of the Invention

The present invention relates to a magnetic bearing control device and an exhaust pump having the control device, and particularly to a technology for identifying a movable range of an eddy current gap sensor configuring a magnetic bearing and a center of the movable range and lifting a rotor shaft and other controlled shafts, which are lifted by the magnetic bearing, at a central position of a protective bearing.

2. Description of the Related Art

Conventional exhaust pumps that are used as gas exhaust means of process chambers or other closed chambers in semiconductor manufacturing devices, flat panel display manufacturing devices, and solar panel manufacturing devices adopt magnetic bearings for the purpose of lifting and supporting a rotating shaft of a rotor (referred to as "rotor shaft" hereinafter) that is rotated when discharging gas. This type of magnetic bearings is disclosed in, for example, Japanese Patent Application Publication No. 2006-83924.

The magnetic bearing disclosed in Japanese Patent Application Publication No. 2006-83924 is bearing means for lifting and supporting a rotor shaft (113) of a turbomolecular pump (100) known as an exhaust pump, the magnetic bearing having eddy current gap sensors (107A, 107B) and electromagnets (104X+, 104X−) on an X-axis of an XY coordinate system and a control device (200) for controlling excitation currents of the X-axis electromagnets (104X+, 104X−). Although not shown, the magnetic bearing also has eddy current gap sensors and electromagnets on a Y-axis of the XY coordinate system.

The turbomolecular pump (100) of Japanese Patent Application Publication No. 2006-83924 is provided with a protective bearing (120) as an auxiliary device of the magnetic bearing. The protective bearing (120) functions to receive and stop an abnormal rotation of a rotor shaft (104) that occurs when the function of the control device (200) for lifting and supporting the rotor shaft (113) is disabled.

Incidentally, when the center of the protective bearing (120) and the rotation center of the rotor shaft (113) are not aligned, the rotor shaft (113) and the protective bearing (120) easily come into contact with each other even when the rotation of the rotor shaft (113) is normal. Therefore, initial adjustment is performed upon factory shipment of the turbomolecular pump (100) so that the rotor shaft (113) rotates about the center of the protective bearing (120).

Figure 4:
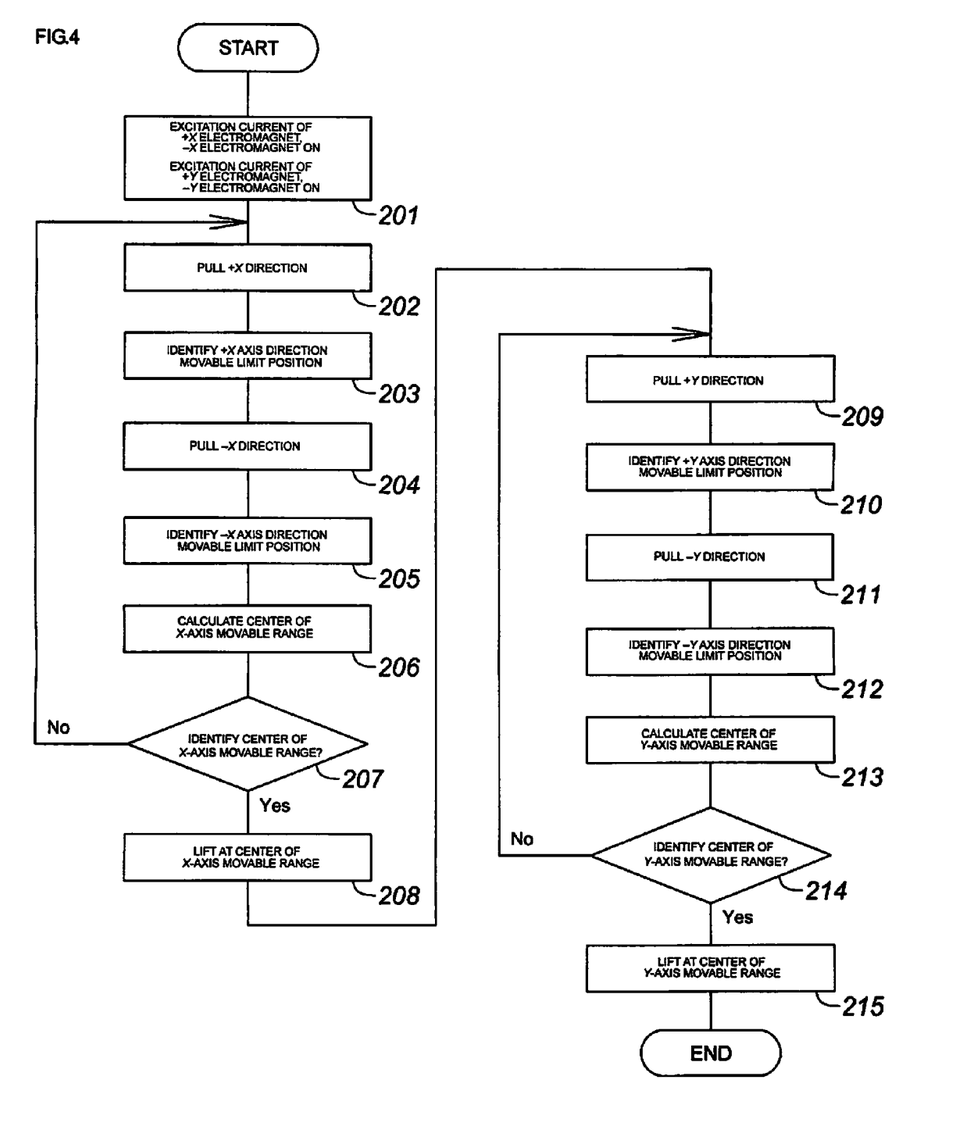
FIG. 4 is a flowchart showing a flow of initial adjustment executed by a conventional magnetic bearing control device.

The initial adjustment is performed according to the flowchart shown in FIG. 4 of the present application. The procedures of the initial adjustment are described hereinafter in accordance with the flowchart shown in FIG. 4.

The flowchart of FIG. 4 is started by, for example, pressing an initial adjustment start button, not shown, of the control device (200). Once the flowchart is started, the magnetic bearing control device (200) starts controlling the excitation currents of the X-axis electromagnets (104X+, 104X−) and the Y-axis electromagnets, not shown, while these excitation currents are ON (applied) (step 201).

Next, the control device (200) pulls the rotor shaft (113) in a +X direction using the +X direction electromagnet (104X+) (step 202). As soon as the pulled rotor shaft (113) comes into contact with an inner ring of the protective bearing (120), detected value of the eddy current gap sensor (107A) in a +X-axis direction and of the eddy current gap sensor (107B) in a −X-axis direction are read, and a +X-axis direction movable limit position of the rotor shaft (113) is identified based on the read detected value (step 203). With the same principle, the control device (200) identifies a −X-axis direction movable limit position of the rotor shaft (113) (steps 204, 205).

The control device (200) thereafter calculates and identifies a midpoint between the +X-axis direction movable limit position and the −X-axis direction movable limit position that are identified as described above, as the center of an X-axis movable range of the eddy current gap sensor, which is, in other words, the center of the X-axis protective bearing (step 206). When the center of the X-axis protective bearing on cannot be calculated and identified, the process returns to step 202 to reattempt the calculation and identification of the center of the X-axis protective bearing (No in step 207). When, on the other hand, the center of the X-axis protective bearing is calculated and identified, the excitation currents of the X-axis electromagnets (104X+, 104X−) are adjusted such that the rotor shaft (113) rotates around the identified center of the X-axis protective bearing (step 208, Yes in step 207).

Subsequently, with the principle same as the one of the abovementioned method of calculating and identifying the center of the X-axis protective bearing, the control device (200) calculates and identifies the center of the Y-axis protective bearing (the center of the magnetic bearing on the Y-axis) (steps 209 to 214), and adjusts the excitation currents of the Y-axis electromagnets, not shown, so that the rotor shaft (113) rotates around the identified center of the Y-axis protective bearing (step 215).

Figure 5:
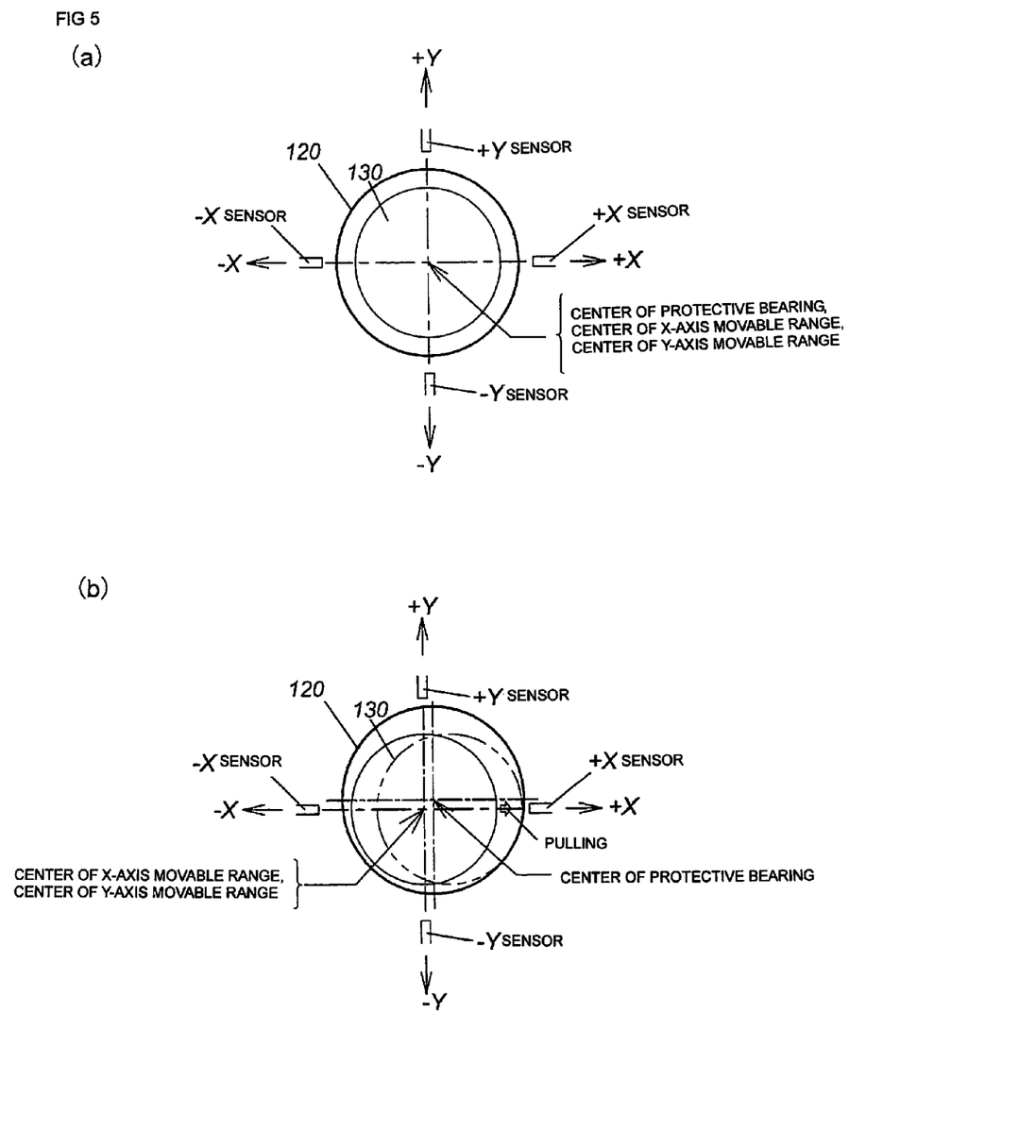
FIG. 5A is an explanatory diagram showing a state in which a center (geometrical/mechanical center) of a protective bearing coincides with a center (electrical center) of an X-axis movable range of an X-axis eddy current gap sensor and in which the center (geometrical/mechanical center) of the protective bearing coincides with a center (electrical center) of a Y-axis movable range of a Y-axis eddy current gap sensor.
FIG. 5B is an explanatory diagram showing a state in which these centers do not coincide with each other.

FIG. 5A of the present application shows a state in which the center (geometrical/mechanical center) of the protective bearing (120) coincides with the center (electrical center) of the X-axis movable range of each X-axis eddy current gap sensor and in which the center of the protective bearing (120) coincides with the center of each Y-axis movable range of the Y-axis eddy current gap sensor, when the conventional initial adjustment is performed according to the flowchart of FIG. 4. In such a state, the initial adjustment can be ended normally. In FIG. 5A of the present application, the X-axis eddy current gap sensor (107B) described above is illustrated as "+X sensor, −X sensor," and the Y-axis eddy current gap sensor, not shown, as "+Y sensor, −Y sensor."

However, in some cases the center of the protective bearing (120) does not coincide with the center of the X-axis movable range of each X-axis eddy current gap sensor as shown in FIG. 5B of the present application, due to attachment position errors of the eddy current gap sensors (+X sensor, −X sensor) or an attachment position error or dimensional tolerance of the protective bearing (120). In such a case, the conventional initial adjustment according to the flowchart of FIG. 4 causes a so-called oscillation phenomenon in which, when the rotor shaft (130) is pulled in the +X direction in step 202, the rotor shaft (130) reciprocates a little at a time along an arc surface of the inner ring of the protective bearing (120).

This oscillation phenomenon is due to the fact that the rotor shaft (130) is moved along the arc surface of the inner ring of the protective bearing (120) by a force component acting in an arc surface tangential direction of the inner ring, the component being a component of force pulling the rotor shaft (130) in the +X direction, and the fact that, since the position of the rotor shaft (130) in the Y-axis direction changes due to its movement, the excitation current for restoring the change acts on the electromagnet in the Y-axis direction, which is not shown. Note that the same oscillation phenomenon occurs when the rotor shaft (130) is moved in the −X direction in step 204 or when the rotor shaft (130) is pulled in the +Y direction or the −Y direction in step 209 or 211.

The occurrence of the oscillation phenomenon of the rotor shaft (130) described above cannot identify the X-axis movable range or the center thereof or lift the rotor shaft at the central position of the protective bearing. For this reason, shipment of the exhaust pump needs to be stopped due to poor initial adjustment.

SUMMARY OF THE INVENTION

The present invention was contrived in view of the problems described above, and an object thereof is to provide a magnetic bearing control device and an exhaust pump having the control device, the magnetic bearing control device being capable of identifying a movable range of an eddy current gap sensor configuring a magnetic bearing and a center of the movable range, and lifting a rotor shaft and other controlled shafts at a central position of a protective bearing, the rotor shaft and other controlled shafts being lifted by the magnetic bearing.

In order to achieve the object described above, a magnetic bearing control device according to the present invention is a magnetic bearing control device in which eddy current gap sensors that are provided on an X-axis and a Y-axis of an XY coordinate system detect gaps between the eddy current gap sensors and a controlled shaft that is lifted by a magnetic bearing, and in which, based on the detected value, an X-axis electromagnet and a Y-axis electromagnet are excited to levitate the controlled shaft using magnetic forces of the electromagnets, the magnetic bearing control device having: a first function for detecting an X-axis direction movable limit position of the controlled shaft; a second function for identifying a center of an X-axis movable range of the X-axis eddy current gap sensor based on the X-axis direction movable limit position detected by the first function; a third function for detecting a Y-axis direction movable limit position of the controlled shaft; a fourth function for identifying a center of a Y-axis movable range of the Y-axis eddy current gap sensor based on the Y-axis direction movable limit position detected by the third function; and a fifth function for turning an excitation current of the Y-axis electromagnet OFF when the first function detects the X-axis direction movable limit position and the second function identifies the center of the X-axis movable range, and turning an excitation current of the X-axis electromagnet OFF when the third function detects the Y-axis direction movable limit position and the fourth function identifies the center of the Y-axis movable rage.

An exhaust pump according to the present invention is an exhaust pump with a shaft supported by the magnetic bearing, characterized in having the magnetic bearing control device.

According to the magnetic bearing control device and the exhaust pump having the control device according to the present invention, the specific configuration of the control device adopts the function of turning the excitation current of the Y-axis electromagnet OFF when the first function detects the X-axis direction movable limit position and the second function identifies the center of the X-axis movable range, and turning the excitation currents of the X-axis electromagnet OFF when the third function detects the Y-axis direction movable limit position and the fourth function identifies the center of the Y-axis movable range. Therefore, when, for example, detecting the X-axis direction movable limit position of the controlled shaft by pulling the controlled shaft and bringing it into contact with an inner circumferential arc surface of the inner ring of the protective bearing provided on an outer circumference of the controlled shaft, a Y-axis direction lifting position of the controlled shaft is not controlled because the excitation current of the Y-axis electromagnet is turned OFF, even when the center of the Y-axis movable range of the Y-axis eddy current gap sensor does not coincide with the center of the protective bearing. Thus, the conventional oscillation phenomenon can be prevented effectively, and the X-axis movable range of the eddy current gap sensor and its center, as well as the Y-axis movable range and its center, can be identified, effectively avoiding a situation where shipment of the exhaust pump is stopped due to poor initial adjustment in which the exhaust pump with the controlled shaft lifted by the magnetic bearing cannot identify the center of the X-axis movable range or Y-axis movable range and, therefore, the controlled shaft cannot be lifted at the central position of the protective bearing.

DESCRIPTION OF THE PREFERRED EMBODIMENTS

Embodiments of the present invention are now described hereinafter with reference to the drawings attached to the present application.

Figure 1:
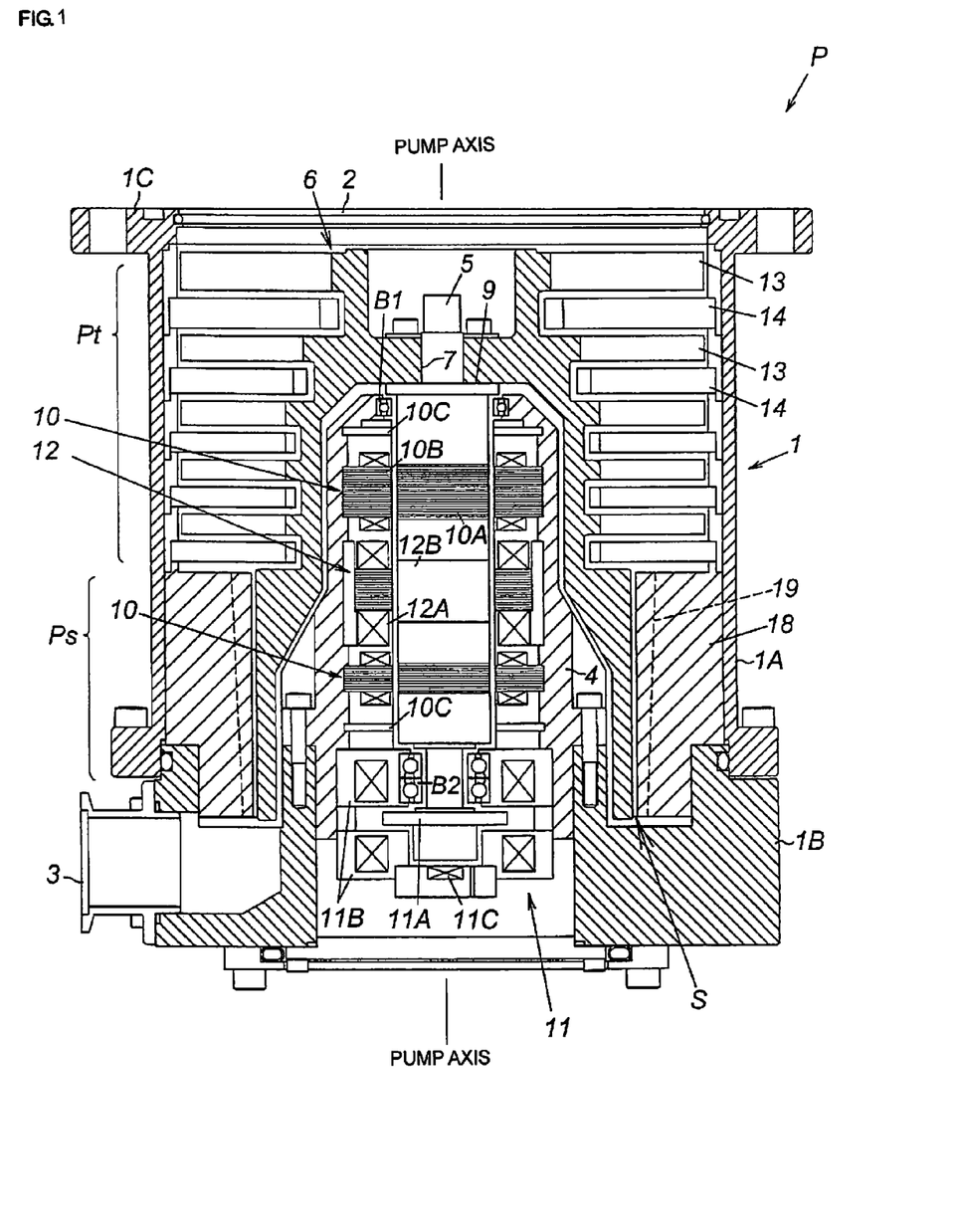
FIG. 1 is a cross-sectional diagram of an exhaust pump to which a magnetic bearing control device of the present invention is applied.

FIG. 1 is a cross-sectional diagram of an exhaust pump to which a magnetic bearing control device according to the present invention is applied. An exhaust pump P shown in the diagram is used as gas exhaust means or the like of a process chamber or another type of closed chamber in, for example, a semiconductor manufacturing device, a flat panel display manufacturing device, or a solar panel manufacturing device. This exhaust pump has, within an outer case 1, a vane exhaust part Pt that discharges gas using rotary vanes 13 and stationary vanes 14, a thread groove exhaust part Ps that discharges gas using a thread groove 19, and a drive system for driving these parts.

The outer case 1 is in the shape of a bottomed cylinder in which a tubular pump case 1A and a bottomed-tubular pump base 1B are integrally coupled to each other by a bolt in a tubular axial direction. An upper end part of the pump case 1A is opened to form a gas intake port 2, and a lower end side surface of the pump base 1B is provided with a gas exhaust port 3.

The gas intake port 2 is connected to a closed chamber, not shown, by a bolt, not shown, which is provided in a flange part 1C provided at an upper rim of the pump case 1A, the closed chamber becoming highly vacuum, such as a process chamber of a semiconductor manufacturing device. The gas exhaust port 3 is connected so as to be communicated with an auxiliary pump, not shown.

A central part inside the pump case 1A is provided with a cylindrical stator column 4 equipped with various electrical components. The stator column 4 is provided upright by having its lower end screwed and fixed to the pump base 1B.

The inside of the stator column 4 is provided with a rotor shaft 5 (controlled shaft) that is lifted by a radial magnetic bearing and an axial magnetic bearing, which are described hereinafter. The rotor shaft 5 is disposed such that an upper end part thereof is directed toward the gas intake port 2 and a lower end part toward the pump base 1B. The upper end part of the rotor shaft 5 is provided in such a manner as to protrude upward from a cylindrical upper end surface of the stator column 4.

The rotor shaft 5 is lifted and supported so as to be rotatable in a radial direction and an axial direction by a magnetic force of the radial magnetic bearing 10 and a magnetic force of the axial magnetic bearing 11, and is driven to rotate by a drive motor 12. The upper and lower ends of the rotor shaft 5 are provided with protective bearings B1, B2 respectively.

<<Detailed Configuration of Drive Motor>>

The drive motor 12 is configured by a stator 12A and a rotator 12B and provided in the vicinity of substantially the center of the rotor shaft 5. The stator 12A of the drive motor 12 is installed inside the stator column 4. The rotator 12B of the drive motor 12 is integrally mounted to an outer circumferential surface of the rotor shaft 5.

<<Detailed Configuration of Protective Bearing B>>

The protective bearing B1 provided on the upper end side of the rotor shaft 5 functions to receive an abnormal rotation of the rotor shaft 5 from the radial direction of the rotor shaft 5 and stops the abnormal rotation when, for example, the functions of the radial magnetic bearing 10 and the axial magnetic bearing 11 for lifting and positioning the rotor shaft 5 are disabled. In order to realize such function of the protective bearing B1, an outer ring of the protective bearing B1 is attached and fixed to an inner circumferential surface of the stator column 4 and an inner ring of the protective bearing B1 is provided to face an upper end outer circumferential surface of the rotor shaft 5 with a predetermined space therebetween.

The protective bearing B2 provided on the lower end side of the rotor shaft 5 functions to mechanically support the rotor shaft 5 in the radial direction and the axial direction by bringing a lower end shoulder part of the rotor shaft 5 into contact with an inner ring end surface of the protective bearing B2 or a lower end outer circumferential surface of the rotor shaft 5 into contact with an inner ring inner circumferential surface of the protective bearing B2, at the time of the abnormal rotation of the rotor shaft 5. In order to realize such function, an outer ring of the protective bearing B2 is attached and fixed to the inner circumferential surface of the stator column 4 via an axial electromagnet 11B therebetween, which is described later, and the inner ring of the protective bearing B2 is provided to face the lower end shoulder part and outer circumferential surface of the rotor shaft 5 with a predetermined space therebetween.

<<Detailed Configuration of Radial Magnetic Bearing>>

A total of two radial magnetic bearings 10 are disposed above and below the drive motor 12. One axial magnetic bearing 11 is disposed on the lower end part side of the rotor shaft 5. For convenience of description, as shown in FIG. 2 the following explains an XY coordinate system that has an X-axis extending in a radial direction of the rotor shaft 5 from a shaft center thereof, which is an origin, and a Y-axis perpendicular to the X-axis.

The two pairs of radial magnetic bearings 10 are each configured by a radial electromagnetic target 10A attached to the outer circumferential surface of the rotor shaft 5, a radial electromagnet 10B installed on an inner side surface of the stator column 4 opposite thereto, and an eddy current gap sensor 10C.

The radial electromagnetic target 10A is formed with a laminated steel sheet obtained by stacking steel sheets of high permeability.

Figure 2:
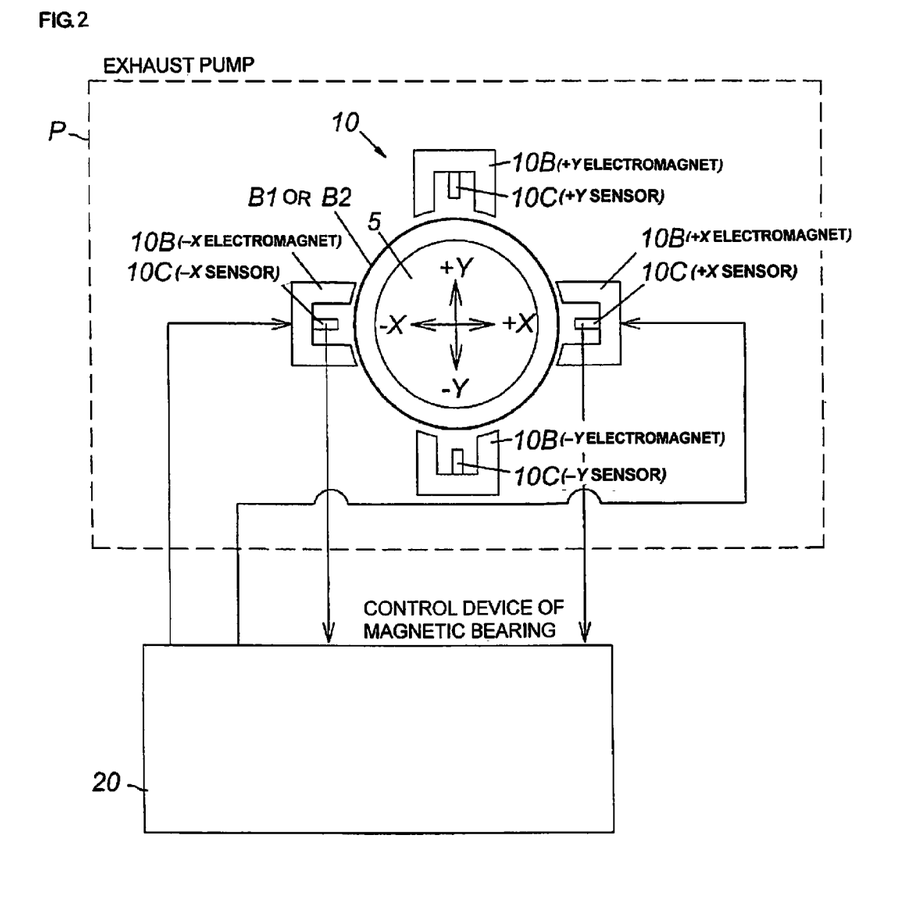
FIG. 2 is an explanatory diagram of the magnetic bearing control device and radial magnetic bearings.

As shown in FIG. 2, a total of four radial electromagnets 10B are disposed in the +X direction, −X direction, +Y direction, and −Y direction, respectively. The radial electromagnets 10B are each excited by an excitation current controlled by the magnetic bearing control device 20 shown in FIG. 2 and magnetically attract the rotor shaft 5 in the radial direction through the radial electromagnetic targets 10A.

Note that, for convenience of description, the X-axis radial electromagnet, which is specifically the radial electromagnet located in the +X direction out of the four radial electromagnets 10B, is referred to as "+X electromagnet" and the radial electromagnet located in the −X direction as "−X electromagnet," hereinafter. In addition, the Y-axis radial electromagnet, which is specifically the radial electromagnet located in the +Y direction, is referred to as "+Y electromagnet" and the radial electromagnet located in the −Y direction as "−Y electromagnet."

A total of four eddy current gap sensors 10C are disposed in the +X direction, −X direction, +Y direction, and −Y direction, respectively. The eddy current gap sensors 10C detect the gaps between the rotor shaft 5 and the eddy current gap sensors 10C. The detected values are output to the magnetic bearing control device 20 shown in FIG. 2.

Note that, for convenience of description, the X-axis radial eddy current gap sensor, which is specifically the eddy current gap sensor located in the +X direction out of the four eddy current gap sensors 10C, is referred to as "+X sensor" and the eddy current gap sensor located in the −X direction as "−X sensor," hereinafter. In addition, the eddy current gap sensor located in the +Y direction, is referred to as "+Y sensor" and the eddy current gap sensor located in the −Y direction as "−Y sensor."

<<Detailed Configuration of Axial Magnetic Bearing>>

The axial magnetic bearing 11 is configured by a disk-shaped armature disk 11A attached to the lower end outer circumference of the rotor shaft 5, upper and lower axial electromagnets 11B that face each other with the armature disk 11A therebetween, and an axial direction displacement sensor 11C installed slightly away from a lower end surface of the rotor shaft 5. The armature disk 11A is made from a material of high permeability. The upper and lower axial electromagnets 11B magnetically attract the armature disk 11A in a vertical direction. The axial direction displacement sensor 11C detects an axial direction displacement of the rotor shaft 5. Controlling the excitation currents of the upper and lower axial electromagnets 11B based on the detected value obtained from the axial direction displacement sensor 11C (the axial direction displacement of the rotor shaft 5), can magnetically levitate the rotor shaft 5 in an axial direction predetermined position.

A rotor 6 is provided outside the stator column 4. This rotor 6 is shaped into a cylinder so as to surround an outer circumference of the stator column 4 and integrated with the rotor shaft 5. According to such an integrated structure, in case of the exhaust pump P shown in FIG. 1, for example, an end surface center of the rotor 6 is provided with a buss hole and a stepped shoulder part (referred to as "rotor shaft shoulder part 9" hereinafter) is formed on an upper end outer circumference of the rotor shaft 5. A tip part of the rotor shaft 5 above the rotor shaft shoulder part 9 is fitted into the boss hole 7 formed on an end surface of the rotor shaft 5, and the end surface of the rotor shaft 5 and the rotor shaft shoulder part 9 are fixed to each other by a bolt. As a result, the rotor 6 and the rotor shaft 5 can be integrated with each other.

The rotor 6 is lifted and supported by the radial magnetic bearings 10 and the axial magnetic bearing 11 via the rotor shaft 5 so as to be able to rotate about a shaft center of the rotor 6 (the rotor shaft 5). Thus, in the exhaust pump P shown in FIG. 1, the rotor shaft 5, the radial magnetic bearings 10, and the axial magnetic bearing 11 function as supporting means for supporting the rotor 6 such that the rotor 6 can rotate about its shaft center. Because the rotor 6 rotates integrally with the rotor shaft 5, the drive motor 12 for rotary driving the rotor shaft 5 functions as driving means for driving to rotate the rotor 6.

<<Detailed Configuration of Magnetic Bearing Control Device>>

The magnetic bearing control device 20 performs the control for magnetically lifting and supporting the rotor shaft 5 by executing the following steps: calculating the difference between two gap values corresponding to the gaps between the rotor shaft 5 to be controlled and the magnetic bearings in the +X direction and the −X direction, the gap values being obtained by the +X sensor and the −X sensor; controlling the excitation currents of the +X electromagnet and the −X electromagnet on the basis of the obtained difference and an X-direction gap correction value; calculating the difference between the detected value of each of the +Y and −Y sensors and the gap value of each of the +Y and −Y directions corresponding thereto; and controlling the excitation currents of the +Y electromagnet and the −Y electromagnet on the basis of the obtained difference and a Y-direction gap correction value. Normally, an initial lifting position is obtained by controlling the electromagnets so as to levitate the rotor shaft 5, with the X-direction and Y-direction gap correction values set at 0.

Initial adjustment for allowing the rotor shaft 5 to rotate at the centers of the protective bearings B1, B2 is performed even in the exhaust pump P of the present embodiment at the time of factory shipment or the like before the exhaust pump P is actually embedded and used in a user's device. This initial adjustment is now described hereinafter.

The magnetic bearing control device 20 described above is configured by a numerical processing apparatus such as a microcomputer and is configured to exert the first to fifth functions provided below by executing an initial adjustment flowchart shown in FIG. 3.

First Function

The first function is for detecting X-axis direction movable limit positions of the rotor shaft 5.

Second Function

The second function is for identifying an X-axis movable range of each X-axis eddy current gap sensor 10C and a center of this movable range (an X-axis movable range center of each radial magnetic bearing) based on the X-axis direction movable limit positions detected by the first function.

Third Function

The third function is for detecting Y-axis direction movable limit positions of the rotor shaft 5.

Fourth Function

The fourth function is for identifying a Y-axis movable range of each Y-axis eddy current gap sensor 10C and a center of this movable range (a Y-axis movable range center of each radial magnetic bearing) based on the Y-axis direction movable limit positions detected by the third function.

Fifth Function

The fifth function is for turning the excitation currents of the Y-axis electromagnets 10B (the +Y electromagnet and the −Y electromagnet) OFF when the first function performs the detection and the second function performs the identification, and turning the excitation currents of the X-axis electromagnets 10B (the +X electromagnet and the −X electromagnet) OFF when the third function performs the detection and the fourth function performs the identification.

Figure 3:
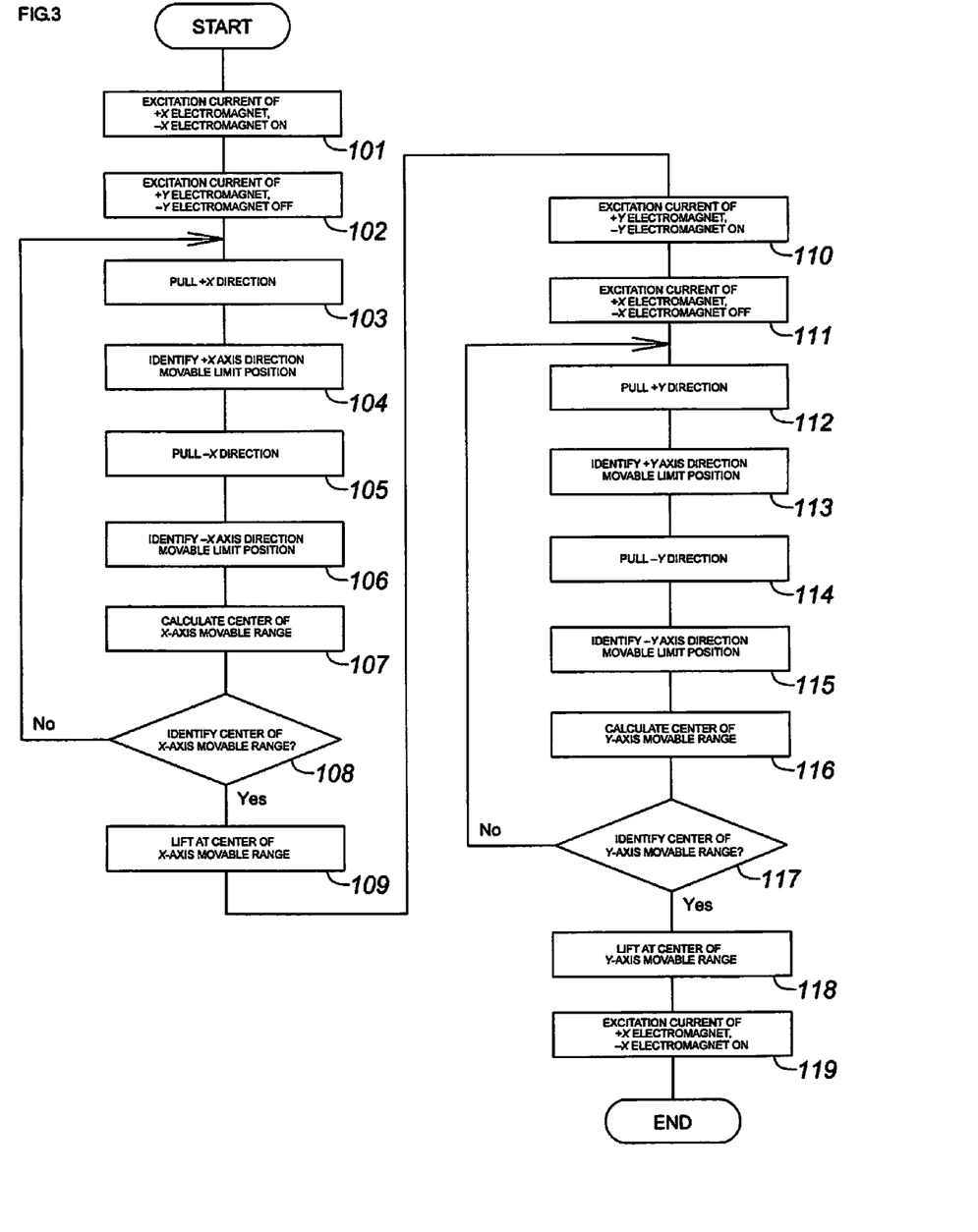
FIG. 3 is a flowchart showing a flow of initial adjustment executed by the magnetic bearing control device shown in FIG. 2.

The initial adjustment flowchart shown in FIG. 3 is described next.

The initial adjustment flowchart shown in FIG. 3 is started by pressing an initial adjustment start button, not shown, of the control device 20. Once the flowchart is started, first, the control device 20 starts controlling the excitation currents of the +X electromagnet and the −X electromagnet (the X-axis radial electromagnets), while these excitation currents of the +X electromagnet and the −X electromagnet are ON (applied), thereby allowing the radial magnetic bearings 10 to control an X-axis direction lifting position of the rotor shaft 5 (step 101). On the other hand, the control device 20 also stops controlling the excitation currents of the +Y electromagnet and the −Y electromagnet (the Y-axis radial electromagnets), while the excitation currents of the +Y electromagnet and the −Y electromagnet are OFF (not applied), so that a Y-axis direction lifting position of the rotor shaft 5 is not controlled by the radial magnetic bearings 10 (step 102).

Subsequently, the control device 20 increases the level of excitation current flowing to the +X electromagnet and reduces the level of excitation current flowing to the −X electromagnet, based on the position corresponding to the initial gap correction value 0, and consequently allows the +X electromagnet 10B to pull the rotor shaft 5 in the +X direction (step 103).

Then, once the pulled rotor shaft 5 comes into contact with inner circumferential arc surfaces of the inner rings of the protective bearings B1, B2, the detected value of the +X and −X sensors are read, and the +X-axis direction movable limit position of the rotor shaft 5 is identified based on the read detected value (step 104). In this case, because the detected value of the +X and −X sensors no longer change (the detected value become saturated) after the rotor shaft 5 comes into contact with the inner circumferential arc surfaces of the inner rings of the protective bearings B1, B2, whether the rotor shaft 5 comes into contact with the arc surfaces or not may be detected by monitoring the amount of change in each detected value, and then the +X-axis direction movable limit position of the rotor shaft 5 may be identified based on the detected value of the +X and −X sensors obtained when it is determined that the rotor shaft 5 comes into contact with the arc surfaces.

The control device 20 then increases the value of current flowing to the −X electromagnet and reduces the value of current flowing to the +X electromagnet, thereby allowing the −X electromagnet 10B to pull the rotor shaft 5 in the −X direction (step 105).

Then, once the pulled rotor shaft 5 comes into contact with the inner circumferential arc surfaces of the inner rings of the protective bearings B1, B2, the detected value of the +X and −X sensors are read, and the −X-axis direction movable limit position of the rotor shaft 5 is identified based on the read detected value (step 106). Identifying the −X-axis direction movable limit position may be performed in the same way as identifying the +X-axis direction movable limit position that is described earlier.

Once the +X-axis direction movable limit position and the −X-axis direction movable limit position are identified in the manners described above, the control device then identifies the range between the +X-axis direction movable limit position and the −X-axis direction movable limit position as the X-axis movable range and calculates and identifies the X-direction gap correction value, with the midpoint between these movable limit positions as the center of the X-axis movable range of each X-axis eddy current gap sensor 10C (the center of the X-axis movable range of each radial magnetic bearing). The X-direction gap correction value is stored in a memory (not shown) of the control device 20 (step 107).

In the subsequent step 108, it is determined whether the center of the X-axis movable range is identified or not in step 107. When the center is not identified, the process returns to step 103 to reattempt the calculation and identification of the center of the X-axis movable range (No in step 108). When, however, the center of the X-axis movable range is identified in step 107, the excitation currents of the X-axis electromagnets 10B are controlled based on the X-direction gap correction value that is stored in the memory in step 107, such that the rotor shaft 5 rotates about the center of the X-axis movable range. Accordingly, the rotor shaft 5 is lifted and supported at the identified center of the X-axis movable range (the center on the X-axis of the radial magnetic bearings) (Yes in step 108, step 109).

Subsequently, the control device 20 starts controlling the excitation currents of the +Y electromagnet and the −Y electromagnet (the Y-axis radial electromagnets), while these excitation currents of the +Y electromagnet and the −Y electromagnet are ON, thereby allowing the radial magnetic bearings 10 to control a Y-axis direction lifting position of the rotor shaft 5 (step 110). On the other hand, the control device 20 also stops controlling the excitation currents of the +X electromagnet and the −X electromagnet (the X-axis radial electromagnets), while the excitation currents of the +X electromagnet and the −X electromagnet are OFF, so that the X-axis direction lifting position of the rotor shaft 5 is not controlled by the radial magnetic bearings 10 (step 111).

Subsequently, the control device 20 increases the level of excitation current flowing to the +Y electromagnet 10B and reduces the level of excitation current flowing to the −Y electromagnet 10B, based on the position corresponding to the initial gap correction value 0, and consequently allows the +Y electromagnet 10B to pull the rotor shaft 5 in the +Y direction (step 112).

Then, once the pulled rotor shaft 5 comes into contact with the inner circumferential arc surfaces of the inner rings of the protective bearings B1, B2, the detected value of the +Y and −Y sensors are read, and the +Y-axis direction movable limit position of the rotor shaft 5 is identified based on the read detected value (step 113). Identifying the +Y-axis direction movable limit position can be performed in the same way as identifying the +X-axis direction movable limit position that is described earlier.

The control device 20 then increases the level of excitation current flowing to the −Y electromagnet 10B and reduces the level of excitation current flowing to the +Y electromagnet 10B, thereby allowing the −Y electromagnet 10B to pull the rotor shaft 5 in the −Y direction (step 114).

Then, once the pulled rotor shaft 5 comes into contact with the inner circumferential arc surfaces of the inner rings of the protective bearings B1, B2, the detect detected value of the +Y and −Y sensors are read, and the −Y-axis direction movable limit position of the rotor shaft 5 is identified based on the read detected value (step 115). Identifying the −Y-axis direction movable limit position can be performed in the same way as identifying the +X-axis direction movable limit position that is described earlier.

Once the +Y-axis direction movable limit position and the −Y-axis direction movable limit position are identified in the manners described above, the control device 20 then identifies the range between the +Y-axis direction movable limit position and the −Y-axis direction movable limit position as the Y-axis movable range and calculates and identifies the Y-direction gap correction value, with the midpoint between these movable limit positions as the center of the Y-axis movable range of each Y-axis eddy current gap sensor 10C (the center of the Y-axis movable range of each radial magnetic bearing). The Y-direction gap correction value is stored in the memory (not shown) of the control device 20 (step 116).

In the subsequent step 117, it is determined whether the center of the Y-axis movable range is identified or not in step 116. When the center is not identified, the process returns to step 112 to reattempt the calculation and identification of the center of the Y-axis movable range (No in step 117). When, however, the center of the Y-axis movable range is identified in step 116, the excitation currents of the Y-axis electromagnets 10B are controlled based on the Y-direction gap correction value that is stored in the memory in step 116, such that the rotor shaft 5 rotates about the center of the Y-axis movable range. Accordingly, the rotor shaft 5 is lifted and supported at the identified center of the Y-axis movable range (the center on the Y-axis of the radial magnetic bearings) (Yes in step 117, step 118).

In the subsequent step 119, the excitation currents of the +X electromagnet and the −X electromagnet (the X-axis radial electromagnets) are turned ON (applied), while the excitation currents of the +Y electromagnet and the −Y electromagnet (the Y-axis radial electromagnets) are kept ON (applied), and the excitation currents of the X-axis electromagnets 10B are controlled based on the X-direction gap correction value that is stored in the memory (not shown) in step 107, such that the rotor shaft 5 rotates about the center of the X-axis movable range. Accordingly, the rotor shaft 5 is lifted and supported so as to rotate about the center of the X-axis movable range and the Y-axis movable range. When there is no abnormality in the rotation of the rotor shaft 5 at this moment, the initial adjustment of the present flowchart is ended, and the exhaust pump P is ready to be shipped or the process can be shifted to another initial adjustment.

<<Detailed Configuration Vane Exhaust Part Pt>>

In the exhaust pump P shown in FIG. 1, a section on the upstream side of substantially the middle of the rotor 6 (a range between substantially the middle of the rotor 6 and an end part near the gas intake port 2 of the rotor 6) functions as the vane exhaust part Pt. This vane exhaust part Pt is described hereinafter in detail.

An outer circumferential surface of the rotor 6 on the upstream side from substantially the middle of the rotor 6 is provided with a plurality of the rotary vanes 13 integrally. The plurality of rotary vanes 13 are arranged radially around a rotary shaft center of the rotor 6 (rotor shaft 5) or a shaft center of the outer case 1 (referred to as "pump shaft center" hereinafter). A plurality of the stationary vanes 14 are provided on an inner circumferential surface of the pump case 1A. These stationary vanes 14 are disposed radially around the pump shaft center. The rotary vanes 13 and the stationary vanes 14 are disposed alternately in a step-like manner along the pump shaft center, to form the vane exhaust part Pt.

The rotary vanes 13 are blade-like cut products that are scraped integrally with an outer-diameter processing part of the rotor 6 in a cutting process and are tilted at an angle appropriate for discharging gas molecules. The stationary vanes 14, too, are tilted at an angle appropriate for discharging gas molecules.

<<Explanation of Exhaust Operation by Vane Exhaust Part Pt>>

In the vane exhaust part Pt with the above-mentioned configuration, activation of the drive motor 12 rotates integrally the rotor shaft 5, the rotor 6, and the plurality of rotary vanes 13 at high speeds. Consequently, the top rotary vane 13 applies a downward momentum to the gas molecules entering from the gas intake port 2. The gas molecules with the downward momentum are carried into the next rotary vane 13 by the stationary vanes 14. Application of a moment to the gas molecules and carrying the gas molecules are repeated in the multiple steps of the rotary vanes. As a result, the gas molecules near the gas intake port 2 are discharged in such a manner as to be shifted sequentially toward a downstream of the rotor 6.

<<Detailed Configuration of Thread Groove Exhaust Part Ps>>

In the exhaust pump P shown in FIG. 1, a section on the downstream-side from the substantially the middle of the rotor (a range between substantially the middle of the rotor 6 and an end part near the gas exhaust port 3 of the rotor 6) functions as the thread groove exhaust part Ps. The thread groove exhaust part Ps is described hereinafter in detail.

The outer circumferential surface of the rotor 6 on the downstream side from substantially the middle of the rotor 6 is a section that rotates as a rotary member of the thread exhaust part Ps and is inserted/accommodated inside a cylindrical thread groove exhaust stator 18, with a predetermined gap therebetween.

The thread groove exhaust stator 18, a tubular stationary member for the thread groove exhaust part Ps, is shaped so as to surround the outer circumference of the rotor (the section on the downstream side from substantially the middle of the rotor 6). An inner circumferential part of the thread groove exhaust stator 18 has the thread groove 19 that tapers down to the bottom. The thread groove 19 is configured so as to form a spiral from an upper end of the thread groove exhaust stator 18 to a lower end of the same. Due to such thread groove 19 and the outer circumferential surface of the rotor 6, a spiral-like thread groove exhaust path S is provided between the rotor 6 and the thread groove exhaust stator 18. Note that the lower end part of the thread groove exhaust stator 18 is supported by the pump base 1B.

Although not shown, the thread groove exhaust path S described may be configured by forming the above-mentioned thread groove 19 on an inner circumferential surface of the rotor 6.

In the thread groove exhaust part Ps, gas is shifted while being compressed by the drag effect of the thread groove 19 and the outer circumferential surface of the rotor 6. Thus, the depth of the thread groove 19 becomes the deepest at an upstream entrance of the thread groove exhaust path S (a path open end closest to the gas intake port 2) and becomes the shallowest at a downstream exit of the path (a path open end closest to the gas exhaust port 3).

The upstream entrance of the thread groove exhaust path S opens toward the bottom rotary vane 13 or stationary vane 14 (the bottom stationary vane 14 in the example shown in FIG. 1), of the rotary vanes 13 disposed in a step-like manner. The downstream exit of the path S is communicated with the gas exhaust port 3 side.

<<Explanation of Exhaust Operation by Thread Groove Exhaust Part Ps>>

The gas molecules, which are carried by the exhaust operation of the abovementioned vane exhaust part Pt and reach the bottom rotary vane 13 or stationary vane 14, shift from the upstream entrance of the thread groove exhaust path S to the thread groove exhaust path S, the upstream entrance being opened toward these vanes. The shifted gas molecules are further shifted toward the gas exhaust port 3 while being compressed from a transitional flow form into a viscous flow form by an effect generated as a result of the rotation of the rotor 6, which is the drag effect of the outer circumferential surface of the rotor 6 and the thread groove 19, and then eventually discharged to the outside via the auxiliary pump, not shown.

According to the exhaust pump P of the present embodiment described above, the specific configuration of the magnetic bearing control device 20 adopts the function of turning the excitation currents of the +Y electromagnet and the −Y electromagnet (the Y-axis electromagnets 10B) OFF when the first function detects the X-axis direction movable limit positions and the second function identifies the X-axis movable range, and turning the excitation currents of the +X electromagnet and the −X electromagnet (the X-axis electromagnets 10B) OFF when the third function detects the Y-axis direction movable limit positions and the fourth function identifies the Y-axis movable range. Therefore, when, for example, detecting an X-axis direction movable limit value of the rotor shaft 5 by pulling the rotor shaft 5 and bringing it into contact with the inner circumferential arc surfaces of the inner rings of the protective bearings B1, B2, the Y-axis direction lifting position of the rotor shaft 5 is not controlled because the excitation currents of the +Y electromagnet and the −Y electromagnet are turned OFF, even when the center of the Y-axis movable range of the Y-axis eddy current gap sensors 10C does not coincide with the centers of the protective bearings B1, B2. Thus, the conventional oscillation phenomenon can be prevented effectively, and the X-axis movable range and its center, as well as the Y-axis movable range and its center, can be identified, avoiding a situation where shipment of the exhaust pump P is stopped due to poor initial adjustment in which the X-axis movable range or Y-axis movable range cannot be identified and, therefore, the rotor shaft cannot be lifted at the central positions of the protective bearings.

EXPLANATION OF REFERENCE NUMERALS

1 Outer case
1A Pump case
1B Pump base
1C Flange
2 Gas intake port
3 Gas exhaust port
4 Stator column
5 Rotor shaft
6 Rotor
7 Boss hole
9 Shoulder part
10 Radial magnetic bearing
10A Radial electromagnetic target
10B X-axis electromagnet
10C X-axis eddy current gap sensor
11 Axial magnetic bearing
11A Armature disk
11B Axial electromagnet
11C Axial direction displacement sensor
12 Drive motor
12A Stator 12B Rotator
13 Rotary vane
14 Stationary vane
18 Thread groove exhaust stator
19 Thread groove
20 Magnetic bearing control device
B1, B2 Protective bearing
P Exhaust pump
Pt Vane exhaust part
Ps Thread groove exhaust part
S Thread groove exhaust path

What is claimed is:

1. A magnetic bearing control device in which eddy current gap sensors that are provided on an X-axis and a Y-axis of an XY coordinate system detect gaps between the eddy current gap sensors and a controlled shaft that is lifted by a magnetic bearing, and in which, based on the detected value, an X-axis electromagnet and a Y-axis electromagnet are excited to levitate the controlled shaft using magnetic forces of the electromagnets, the magnetic bearing control device comprising:
a first function for detecting an X-axis direction movable limit position of the controlled shaft;
a second function for identifying a center of an X-axis movable range of the X-axis eddy current gap sensor based on the X-axis direction movable limit position detected by the first function;
a third function for detecting a Y-axis direction movable limit position of the controlled shaft;
a fourth function for identifying a center of a Y-axis movable range of the Y-axis eddy current gap sensor based on the Y-axis direction movable limit position detected by the third function; and
a fifth function for turning an excitation current of the Y-axis electromagnet OFF when the first function detects the X-axis direction movable limit position and the second function identifies the center of the X-axis movable range, and turning an excitation current of the X-axis electromagnet OFF when the third function detects the Y-axis direction movable limit position and the fourth function identifies the center of the Y-axis movable rage.

2. An exhaust pump having the controlled shaft supported by the magnetic bearing, the exhaust pump comprising the magnetic bearing control device according to claim 1.

* * * * *